(12) United States Patent
Kato

(10) Patent No.: US 10,282,272 B2
(45) Date of Patent: May 7, 2019

(54) OPERATION MANAGEMENT APPARATUS AND OPERATION MANAGEMENT METHOD

(71) Applicant: NEC Corporation, Minato-ku, Tokyo (JP)

(72) Inventor: Kiyoshi Kato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 643 days.

(21) Appl. No.: 14/442,207

(22) PCT Filed: Nov. 14, 2013

(86) PCT No.: PCT/JP2013/006688
§ 371 (c)(1),
(2) Date: May 12, 2015

(87) PCT Pub. No.: WO2014/080598
PCT Pub. Date: May 30, 2014

(65) Prior Publication Data
US 2016/0306727 A1    Oct. 20, 2016

(30) Foreign Application Priority Data
Nov. 20, 2012   (JP) ................ 2012-254389

(51) Int. Cl.
G06F 11/34    (2006.01)
G06F 11/30    (2006.01)

(52) U.S. Cl.
CPC ...... *G06F 11/3428* (2013.01); *G06F 11/3006* (2013.01); *G06F 11/3447* (2013.01); *G06F 11/3457* (2013.01)

(58) Field of Classification Search
CPC ............. G06F 11/3428; G06F 11/3006; G06F 11/3447; G06F 11/3457

(Continued)

(56) References Cited

U.S. PATENT DOCUMENTS 8,959,401 B2   2/2015 Kato
2009/0216624 A1   8/2009 Kato
(Continued)

FOREIGN PATENT DOCUMENTS

CN   102099795 A   6/2011
CN   102576328 A   7/2012
(Continued)

OTHER PUBLICATIONS

Chinese Office Action for CN Application No. 201380060602.X dated Sep. 27, 2016 with English Translation.
(Continued)

*Primary Examiner* — Aniss Chad
*Assistant Examiner* — Justin C Mikowski

(57) ABSTRACT

An operation management apparatus for discerning a bottleneck of a system in an execution environment of a migration-destination without operating the system in the execution environment of the migration-destination is provided. The operation management apparatus (100) includes a correlation model storage unit (112) and a prediction model generation unit (105). The correlation model storage unit (112) stores a correlation model (260) indicating a correlation for each pair of one or more metrics in a state of executing a predetermined program processing in a first processing system. The prediction model generation unit (105) generates, by correcting the correlation model (260) of the first processing system using benchmark performances acquired in a state of executing a predetermined benchmark processing in the first processing system and a second processing system, a prediction model (370) of a correlation model in a state of executing the predetermined program processing in the second processing system.

9 Claims, 17 Drawing Sheets

(58) Field of Classification Search
USPC .......................................................... 703/22
See application file for complete search history.

(56) References Cited

U.S. PATENT DOCUMENTS

| | | |
|---|---|---|
| 2009/0217099 A1 | 8/2009 | Kato |
| 2010/0082321 A1 | 4/2010 | Cherkasova et al. |
| 2011/0161743 A1 | 6/2011 | Kato |
| 2012/0011378 A1* | 1/2012 | Dalton ................ G06F 11/3062 713/300 |
| 2012/0124318 A1* | 5/2012 | Bivens ................ G06F 11/3409 711/170 |
| 2013/0232369 A1* | 9/2013 | James ................ G06F 11/0751 713/340 |
| 2014/0173363 A1 | 6/2014 | Kato |
| 2016/0274965 A1 | 9/2016 | Kato |

FOREIGN PATENT DOCUMENTS

| | | |
|---|---|---|
| EP | 2913756 A1 | 9/2015 |
| JP | 2008-146313 A | 6/2008 |
| JP | 2008-171235 A | 7/2008 |
| JP | 4872944 B2 | 9/2009 |
| JP | 4872945 B2 | 9/2009 |
| JP | 2011-258058 A | 12/2011 |

OTHER PUBLICATIONS

International Search Report for PCT Application No. PCT/JP2013/006688, dated Feb. 18, 2014.
English translation for Write opinion of PCT/JP2013/006688.
Extended European Search Report for EP Application No. EP13856296.2 dated Jun. 28, 2016.

* cited by examiner

Fig. 6

| 400 SERVER CHARACTERISTIC INFORMATION | | | | |
|---|---|---|---|---|
| SERVER NAME | DEVICE TYPE | CPU LOAD | DISK LOAD | ... |
| WEB SERVER | R1 | INTERMEDIATE | INTERMEDIATE | ... |
| AP SERVER | R1 | HIGH | INTERMEDIATE | ... |
| DB SERVER | R1 | INTERMEDIATE | HIGH | ... |
| ... | ... | ... | ... | ... |

Fig. 8

| TIME | WEB.CPU | WEB.MEM | WEB.DISK | WEB.NW | AP.CPU | ... |
|---|---|---|---|---|---|---|
| ... | ... | ... | ... | ... | ... | ... |
| 2007/10/05 17:25 | 12 | 80 | ... | ... | 33 | ... |
| 2007/10/05 17:26 | 15 | 79 | ... | ... | 32 | ... |
| 2007/10/05 17:27 | 34 | 51 | ... | ... | 32 | ... |
| 2007/10/05 17:28 | 63 | 51 | ... | ... | 35 | ... |
| 2007/10/05 17:29 | 20 | 81 | ... | ... | 50 | ... |
| 2007/10/05 17:30 | 10 | 78 | ... | ... | 51 | ... |
| 2007/10/05 17:31 | 11 | 79 | ... | ... | 34 | ... |
| ... | ... | ... | ... | ... | ... | ... |
| 2007/11/07 8:30 | 20 | 79 | ... | ... | 90 | ... |

Fig. 9

260 CORRELATION MODEL

| INPUT (X) | OUTPUT (Y) | α | β | ... | WEIGHT | ... |
|---|---|---|---|---|---|---|
| WEB.CPU | WEB.DISK | 0.8 | 10 | ... | 0.88 | ... |
| AP.CPU | AP.DISK | 0.8 | 10 | ... | 0.83 | ... |
| AP.CPU | DB.DISK | 0.96 | 70 | ... | 0.63 | ... |
| DB.CPU | DB.DISK | 0.8 | 100 | ... | 0.81 | ... |
| WEB.NW | AP.NW | 1.3 | 0 | ... | 0.98 | ... |
| AP.NW | DB.NW | 0.3 | 0 | ... | 0.98 | ... |
| WEB.NW | AP.CPU | 0.0026 | 16 | ... | 0.80 | ... |
| AP.NW | AP.CPU | 0.002 | 16 | ... | 0.82 | ... |
| DB.NW | DB.CPU | 0.008 | −14 | ... | 0.79 | ... |

Fig. 11

124 BENCHMARK PERFORMANCE RATIO INFORMATION

| MIGRATION-SOURCE/ MIGRATION-DESTINATION | DEVICE TYPE | USE | PRICE | PERFORMANCE ITEM | DIVISION | BENCHMARK PERFORMANCE | BENCHMARK PERFORMANCE RATIO | CORRECTED PERFORMANCE RATIO |
|---|---|---|---|---|---|---|---|---|
| MIGRATION-SOURCE | PROCESSING DEVICE (R1) | — | — | CPU | — | 80 | 1.0 | 1.0 |
| | | | | DISK | — | 50 | 1.0 | 0.8 |
| | | | | NW (INTER-DEVICE) | — | 100 | 1.0 | 1.0 |
| MIGRATION-DESTINATION | VM (VM-A/S1) | LOW LOAD | 20,000 | CPU | LOW SPEED | 96 | 1.2 | 1.2 |
| | | | | DISK | INTERMEDIATE SPEED | 60 | 1.2 | 0.96 |
| | | | | NW (INTER-DEVICE) | — | 200 | 2.0 | 2.0 |
| | VM (VM-B/S1) | STANDARD | 40,000 | CPU | INTERMEDIATE SPEED | 120 | 1.5 | 1.5 |
| | | | | DISK | INTERMEDIATE SPEED | 60 | 1.2 | 1.2 |
| | | | | NW (INTER-VM) | — | 200 | 2.0 | 2.0 |
| | VM (VM-C/S2) | CALCULATION | 60,000 | CPU | HIGH SPEED | 160 | 2.0 | 1.5 |
| | | | | DISK | INTERMEDIATE SPEED | 60 | 1.2 | 1.2 |
| | | | | NW (INTER-DEVICE) | — | 80 | 0.8 | 0.8 |
| | VM (VM-D/S1) | STORAGE | 80,000 | CPU | INTERMEDIATE SPEED | 120 | 1.5 | 1.5 |
| | | | | DISK | HIGH SPEED | 80 | 1.6 | 1.2 |
| | | | | NW (INTER-DEVICE) | — | 80 | 0.8 | 0.8 |

370 PREDICTION MODEL

| INPUT (X) | OUTPUT (Y) | α | β | ⋯ | WEIGHT | ⋯ |
|---|---|---|---|---|---|---|
| WEB.CPU | WEB.DISK | 0.8 | 10 | ⋯ | 0.88 | ⋯ |
| AP.CPU | AP.DISK | 0.8 | 10 | ⋯ | 0.83 | ⋯ |
| AP.CPU | DB.DISK | _0.77_ | _73_ | ⋯ | 0.63 | ⋯ |
| DB.CPU | DB.DISK | 0.8 | 100 | ⋯ | 0.81 | ⋯ |
| WEB.NW | AP.NW | _1.04_ | 0 | ⋯ | 0.98 | ⋯ |
| AP.NW | DB.NW | _0.24_ | 0 | ⋯ | 0.98 | ⋯ |
| WEB.NW | AP.CPU | _0.0021_ | _16_ | ⋯ | 0.80 | ⋯ |
| AP.NW | AP.CPU | 0.002 | 16 | ⋯ | 0.82 | ⋯ |
| DB.NW | DB.CPU | 0.008 | −14 | ⋯ | 0.79 | ⋯ |

Fig. 14

129 PREDICTION PERFORMANCE RATIO INFORMATION

| SERVER NAME | DEVICE TYPE | PERFORMANCE ITEM | DESIGNATED VALUE | MIGRATION-SOURCE PREDICTION VALUE | MIGRATION-DESTINATION PREDICTION VALUE | PREDICTION PERFORMANCE RATIO |
|---|---|---|---|---|---|---|
| WEB SERVER | VM (VM-B/S1) | CPU | | n/a | n/a | n/a |
| | | DISK | | n/a | n/a | n/a |
| | | NW (INTER-DEVICE) | 24000 | ↓ | ↓ | 1.0 |
| AP SERVER | VM (VM-C/S2) | CPU | | 78.4 | 65.9 | 0.84 |
| | | DISK | | 72.7 | 62.7 | 0.86 |
| | | NW (INTER-DEVICE) | | 31200 | 24960 | 0.80 |
| DB SERVER | VM (VM-D/S1) | CPU | | 60.9 | 33.9 | 0.56 |
| | | DISK | | 149 | 127 | 0.85 |
| | | NW (INTER-DEVICE) | | 9360 | 5990 | 0.64 |

OPERATION MANAGEMENT APPARATUS AND OPERATION MANAGEMENT METHOD

This application is a National Stage Entry of PCT/JP2013/006688 filed on Nov. 14, 2013, which claims priority from Japanese Patent Application 2012-254389 filed on Nov. 20, 2012, the contents of all of which are incorporated herein by reference, in their entirety.

TECHNICAL FIELD

The present invention relates to an operation management apparatus and an operation management method.

BACKGROUND ART

With the technological advance of virtual machine execution environment and cloud computing, it has been necessary to perform an operation for migrating a system having been fixedly installed so far to another execution environment according to an external environment change such as a disaster occurrence, a rapid load variation, and the like. Upon the migration, it is demanded to accurately estimate a processing performance necessary for an execution environment of the migration-destination and to deploy computer resources suitable for the execution environment of the migration-destination to enhance a service level with suppressing cost associated with the migration.

As a technique for responding to such a situation, for example, PTL 1 discloses a technique for generating a performance model (correlation model) of a system based on performance information collected from a system where an operation service is operated and for analyzing a bottleneck of the system using the performance model.

As a related technique, PTL 2 discloses a technique for detecting correlation destruction using a performance model generated in the same manner as in PTL 1 and identifying a cause of the failure. PTL 3 discloses a performance evaluation support system that executes a benchmark program in a standby server and a newly installed server and measures resource usages of a CPU (Central Processing Unit), a storage device, a network, and the like.

CITATION LIST

Patent Literature

[PTL 1 ] Japanese Patent Publication No. 4872945
[PTL 2 ] Japanese Patent Publication No. 4872944
[PTL 3 ] Japanese Patent Application Laid-Open No. 2008-146313

SUMMARY OF INVENTION

Technical Problem

An operation management apparatus as in PTL 1 described above generates a performance model and therefore, needs performance information collected from a system in operation. Therefore, to discern a bottleneck of a system in an execution environment of a migration-destination, it has been necessary to operate the system in the execution environment of the migration-destination.

An object of the present invention is to solve the above problems and to provide an operation management apparatus and an operation management method capable of discerning a bottleneck of a system in an execution environment of a migration-destination without operating the system in the execution environment of the migration-destination.

Solution to Problem

An operation management apparatus according to an exemplary aspect of the invention includes: a correlation model storage means for storing a correlation model indicating a correlation for each pair of one or more metrics in a state of executing a predetermined program processing in a first processing system; and a prediction model generation means for generating, by correcting the correlation model of the first processing system using benchmark performances acquired in a state of executing a predetermined benchmark processing in the first processing system and a second processing system which is different from the first processing system, a prediction model of a correlation model in a state of executing the predetermined program processing in the second processing system.

An operation management method according to an exemplary aspect of the invention includes: storing a correlation model indicating a correlation for each pair of one or more metrics in a state of executing a predetermined program processing in a first processing system; and generating, by correcting the correlation model of the first processing system using benchmark performances acquired in a state of executing a predetermined benchmark processing in the first processing system and a second processing system which is different from the first processing system, a prediction model of a correlation model in a state of executing the predetermined program processing in the second processing system.

A computer readable storage medium according to an exemplary aspect of the invention records thereon a program, causing a computer to perform a method including: storing a correlation model indicating a correlation for each pair of one or more metrics in a state of executing a predetermined program processing in a first processing system; and generating, by correcting the correlation model of the first processing system using benchmark performances acquired in a state of executing a predetermined benchmark processing in the first processing system and a second processing system which is different from the first processing system, a prediction model of a correlation model in a state of executing the predetermined program processing in the second processing system.

Advantageous Effects of Invention

An advantageous effect of the present invention is that it is possible to discern a bottleneck of a system in an execution environment of a migration-destination without operating the system in the execution environment of the migration-destination.

BRIEF DESCRIPTION OF DRAWINGS

FIG. 6 is a chart illustrating an example of server characteristic information 400 in the first exemplary embodiment of the present invention.

FIG. 8 is a chart illustrating an example of performance information in the first exemplary embodiment of the present invention.

FIG. 9 is a chart illustrating an example of a correlation model 260 in the first exemplary embodiment of the present invention.

FIG. 11 is a chart illustrating an example of benchmark performance ratio information 124 in the first exemplary embodiment of the present invention.

FIG. 14 is a chart illustrating an example of prediction performance ratio information 129 in the first exemplary embodiment of the present invention.

DESCRIPTION OF EMBODIMENTS (First Exemplary Embodiment)

A first exemplary embodiment of the present invention will now be described.

Figure 2:
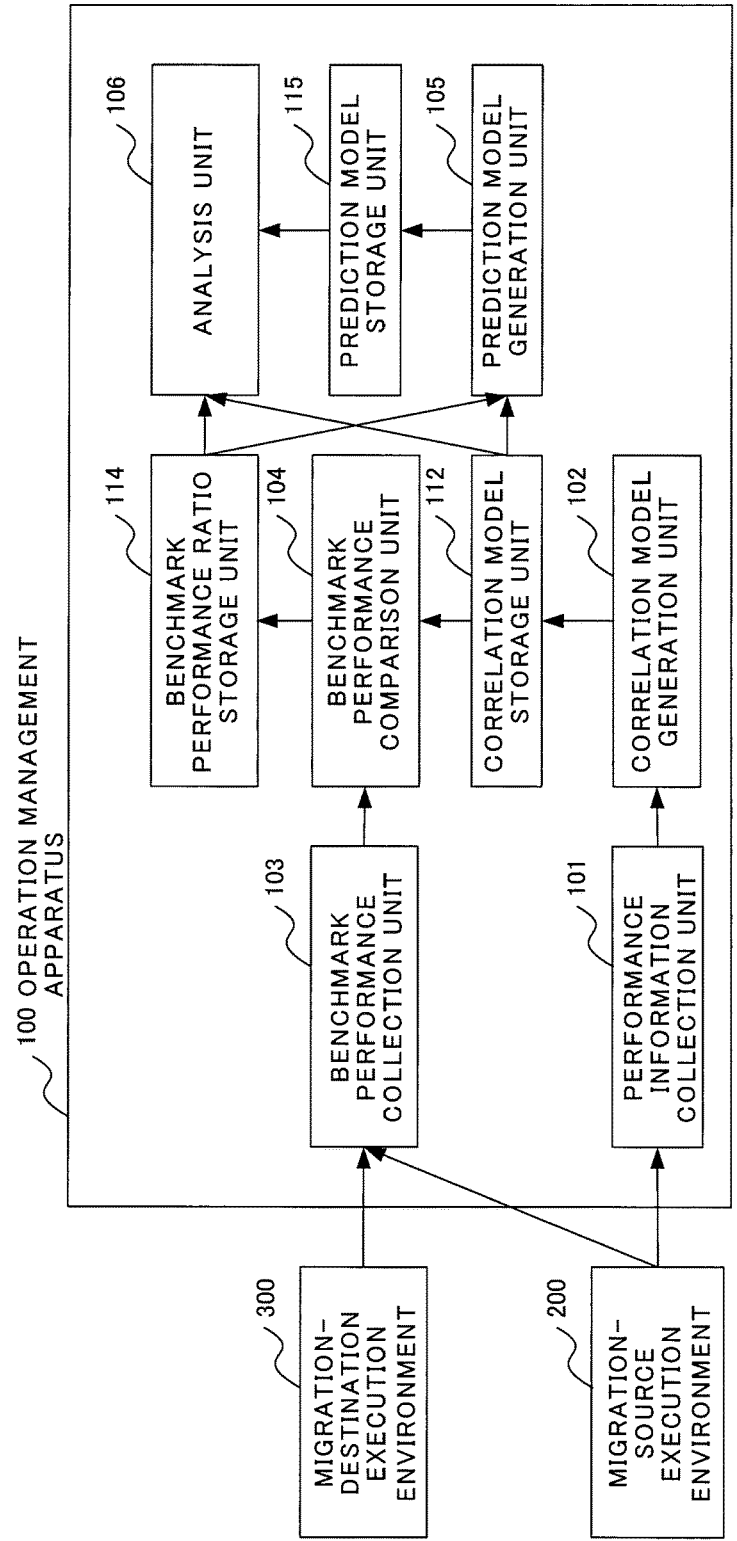
FIG. 2 is a block diagram illustrating a configuration of an operation management system including an operation management apparatus 100 in the first exemplary embodiment of the present invention.

Initially, a configuration of an operation management apparatus 100 of the first exemplary embodiment of the present invention is described. FIG. 2 is a block diagram illustrating a configuration of an operation management system including the operation management apparatus 100 in the first exemplary embodiment of the present invention.

Referring to FIG. 2, the operation management apparatus 100 of the first exemplary embodiment of the present invention includes a performance information collection unit 101, a correlation model generation unit 102, a correlation model storage unit 112, a benchmark performance collection unit 103, a benchmark performance comparison unit 104, a benchmark performance ratio storage unit 114, a prediction model generation unit 105, a prediction model storage unit 115, and an analysis unit 106.

The operation management apparatus 100 is connected to a migration-source execution environment 200 and a migration-destination execution environment 300 via a network or the like that is not illustrated.

In the first exemplary embodiment of the present invention, a system (service system) for providing information communication services such as WEB services, operation services, and the like is configured by various types of servers such as a WEB server, an AP server, a DB server, and the like. These servers are disposed on different physical processing devices (computers) or different virtual processing devices (VMs (Virtual Machines)), respectively, in the migration-source execution environment 200 and the migration-destination execution environment 300. In each processing device, a program (server program) processing of the disposed server is executed.

Sets of processing devices and VMs in which servers configuring the system are disposed in the migration-source execution environment 200 and the migration-destination execution environment 300 are referred to as a migration-source processing system 250 (or a first processing system) and a migration-destination processing system 350 (or a second processing system), respectively. Processing devices and VMs configuring the migration-source processing system 250 are referred to as migration-source devices. Further, processing devices and VMs available for configuring the migration-destination processing system 350 are referred to as migration-destination candidate devices. Furthermore, processing devices and VMs configuring the migration-destination processing system 350 in which the service system has been migrated are referred to as migration-destination devices.

Figure 3:
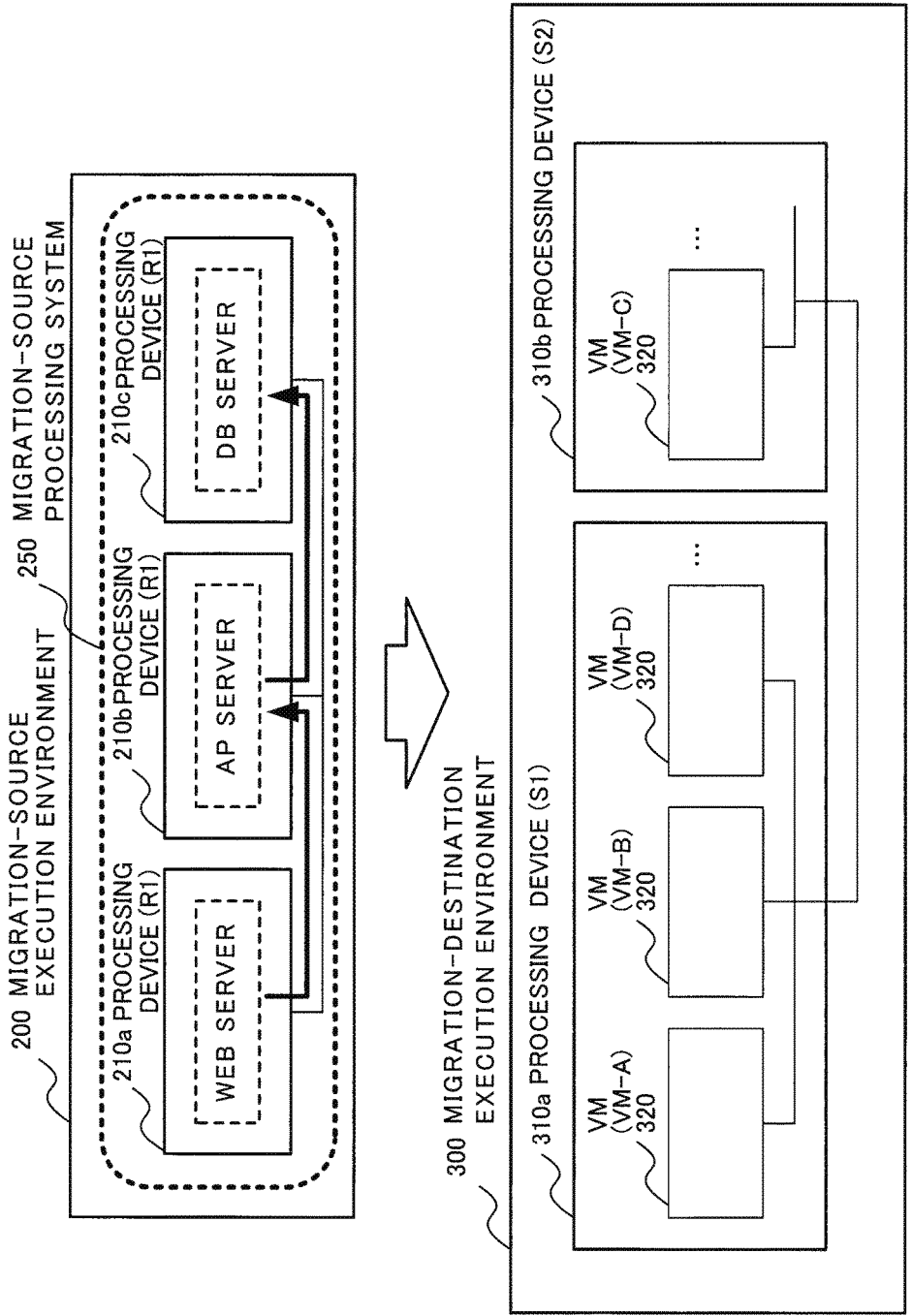
FIG. 3 is a block diagram illustrating a configuration example of each of a migration-source execution environment 200 and a migration-destination execution environment 300 in the first exemplary embodiment of the present invention.

FIG. 3 is a block diagram illustrating a configuration example of each of the migration-source execution environment 200 and the migration-destination execution environment 300 in the first exemplary embodiment of the present invention.

The migration-source execution environment 200 includes one or more processing devices 210 (210a, b, . . .). The processing devices 210 are connected to each other via an inter-device network. In the example of FIG. 3, the migration-source processing system 250 is configured by processing devices 210a (WEB server), 210b (AP server), and 210c (DB server) of a device type R1.

The migration-destination execution environment 300 includes one or more processing devices 310 (310a, b, . . .). The processing devices 310 are connected to each other via an inter-device network. On the processing devices 310, VMs (Virtual Machines) 320 that are virtual processing devices are constructed. The VMs 320 in the processing devices 310 are connected to each other via an inter-VM network.

It is assumed that on the processing device 310a of a device type S1, the VMs 320 of device types VM-A, VM-B, and VM-D are constructable. Further, it is assumed that on the processing device 310b of a device type S2, the VM 320 of a device type VM-C is constructable. In the migration-destination execution environment 300, using these VMs 320, the migration-destination processing system 350 is configured.

FIG. 6 is a chart illustrating an example of server characteristic information 400 in the first exemplary embodiment of the present invention. The server characteristic information 400 indicates, for each server configuring a service system, a device type of the processing device 210 where the server is disposed and processing characteristics (CPU load, disk load, and the like) of the server. The example of FIG. 6 indicates that the AP server has a large CPU load and the DB server has a large disk load.

The performance information collection unit 101 collects a measured value of a predetermined performance item of each server configuring the migration-source processing system 250 at a predetermined performance information collection period when processing of each server program of a service system to be a migration target is being executed (in a state of operating a service system) in the migration-source processing system 250. As performance items regarding computer resources, there are used, for example, a CPU usage (CPU), a memory usage (MEM), and a disk access frequency (DISK) of a processing device (or VM) in which processing of each server is executed. As a performance item regarding communications between computers, for example, a total value of data transmission/reception amounts (NWs) to/from another processing device (or VM) is used. A data transmission/reception amount (total amount) or each of a data transmission amount and a data reception amount to/from each of a plurality of other processing devices (or VMs) is usable as a performance item.

A set of a server and a performance item is defined as a metric (performance indicator) and a set of values of a plurality of metrics measured at the same time is defined as performance information. The metrics correspond to "elements" for which a correlation model is generated in PTL 1 and PTL 2.

The correlation model generation unit 102 generates a correlation model 260 in a state of operating a service system in the migration-source processing system 250, based on time-series changes of performance information in a predetermined period.

The correlation model storage unit 112 stores the correlation model 260 (performance model) generated by the correlation model generation unit 102.

The benchmark performance collection unit 103 collects measured values (benchmark performances) of each performance item upon executing processing providing a load by a predetermined method in a migration-source device and a migration-destination candidate device.

The benchmark performance comparison unit 104 compares processing performances of the migration-source device and the migration-destination candidate device for each performance item, based on the benchmark performances collected by the benchmark performance collection unit 103 and generates benchmark performance ratio information 124.

The benchmark performance ratio storage unit 114 stores the benchmark performance ratio information 124.

The prediction model generation unit 105 generates a prediction model 370 in which a correlation model in a state of operating a service system in the migration-destination processing system 350 has been predicted, based on the correlation model 260 and the benchmark performance ratio information 124.

The prediction model storage unit 115 stores the prediction model 370 generated by the prediction model generation unit 105.

The analysis unit 106 generates a plan of the migration-destination processing system 350 based on the benchmark performance ratio information 124. Further, the analysis unit 106 predicts a value of a metric in a state of operating the service system in the migration-destination processing system 350, using the prediction model 370.

The operation management apparatus 100 may be a computer including a CPU and a storage medium stored with a program and operating by being controlled based on the program. The correlation model storage unit 112, the benchmark performance ratio storage unit 114, and the prediction model storage unit 115 may be configured by individual storage media or one storage medium.

Next, an operation of the operation management apparatus 100 in the first exemplary embodiment of the present invention will be described.

Figure 7:
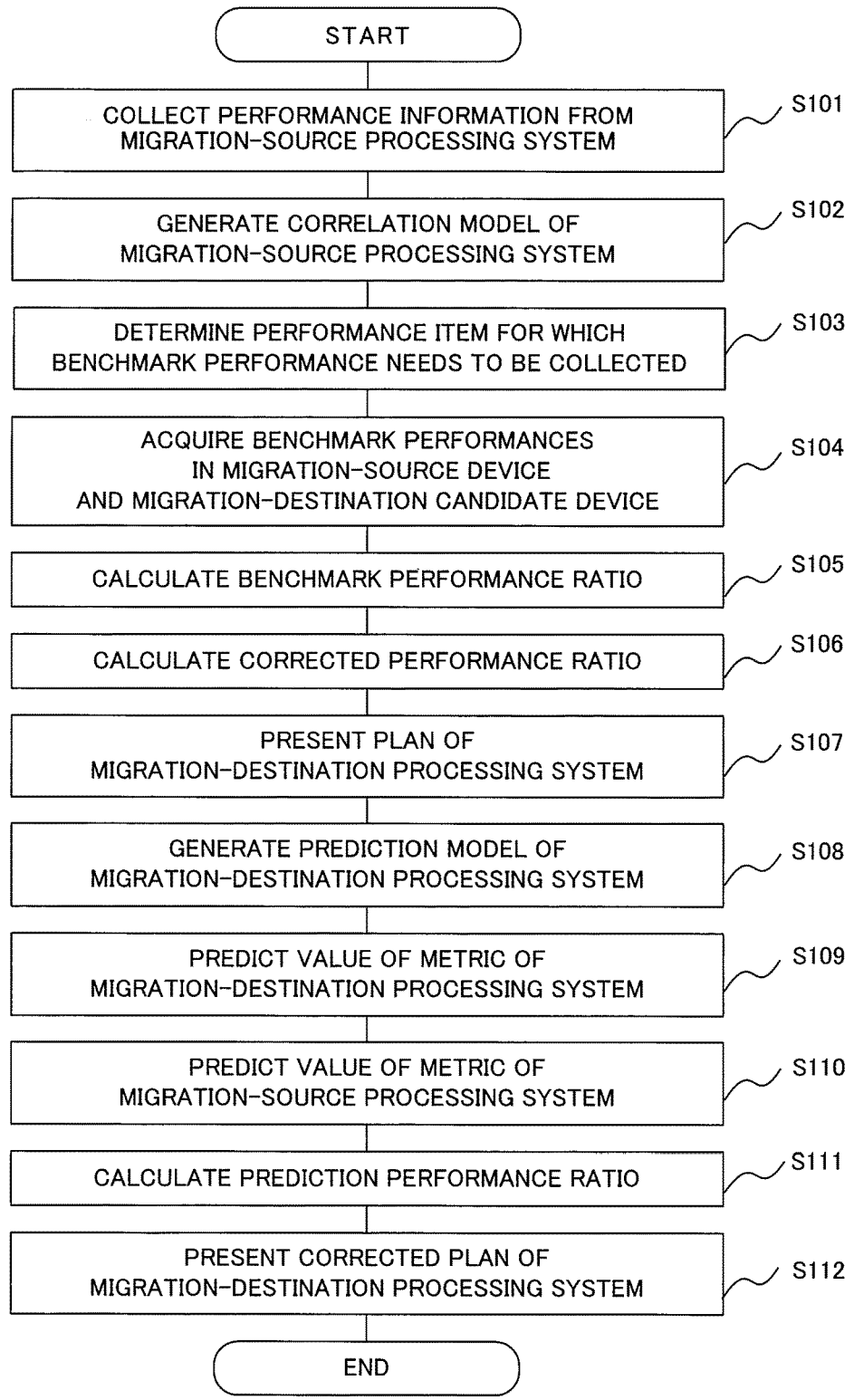
FIG. 7 is a flowchart illustrating processing of the operation management apparatus 100 in the first exemplary embodiment of the present invention.

FIG. 7 is a flowchart illustrating processing of the operation management apparatus 100 in the first exemplary embodiment of the present invention.

Initially, the performance information collection unit 101 collects performance information from a migration-source device at a predetermined performance information collection period in a state of operating a service system in the migration-source processing system 250 (step S101).

FIG. 8 is a chart illustrating an example of the performance information in the first exemplary embodiment of the present invention. In the example of FIG. 8, the performance information includes, as metrics, values of respective performance items (CPU, MEM, DISK, and NW) of the processing devices 210 where respective servers (a WEB server, an AP server, and a DB server) are disposed.

The correlation model generation unit 102 generates the correlation model 260 of the migration-source processing system 250 based on time-series changes of the performance information in a predetermined period (step S102). The correlation model generation unit 102 stores the generated correlation model 260 in the correlation model storage unit 112.

The correlation model 260 includes a correlation function (or a conversion function) indicating a correlation for each pair (couple) of metrics among a plurality of metrics. The correlation function refers to a function for predicting a time sequence of values of one metric from a time sequence of values of the other metric in a pair of metrics. The correlation model generation unit 102 determines coefficients of the correlation function for each pair of metrics based on performance information in a predetermined modeling period. The coefficients of the correlation function are determined by system identification processing for a time sequence of measured values of the metrics in the same manner as in the operation management apparatuses of PTL 1 and PTL 2. The correlation model generation unit 102 calculates a weight based on a conversion error of the correlation function for each pair of the metrics in the same manner as in the operation management apparatuses of PTL 1 and PTL 2 and sets a set of correlation functions having a weight of equal to or greater than a predetermined value (effective correlation functions) as the correlation model 260.

FIG. 9 is a chart illustrating an example of the correlation model 260 in the first exemplary embodiment of the present invention. FIG. 9 illustrates the correlation model 260 generated based on the performance information of FIG. 8. In the example of FIG. 9, the correlation model 260 includes coefficients ($\alpha$, $\beta$) of a correlation function and a weight for each pair of an input metric (X) and an output metric (Y). The correlation function is assumed as $Y=\alpha X+\beta$. For example, for an input metric X "WEB.CPU" and an output metric Y "WEB.DISK", "$\alpha=0.8$" and "$\beta=10$" are calculated.

As long as a time sequence of values of one metric of a pair of the metrics is detected from a time sequence of values of the other metric, the correlation model generation unit 102 may use another function expression as the correlation function. Using, for example, Y1 and Y2 indicating a past time sequence of Y and X1 and X2 indicating a past time sequence of X, the correlation model generation unit 102 may calculate coefficients a to e indicated by a function expression of $Y=aY1+bY2+cX1+dX2+e$.

Figure 10:
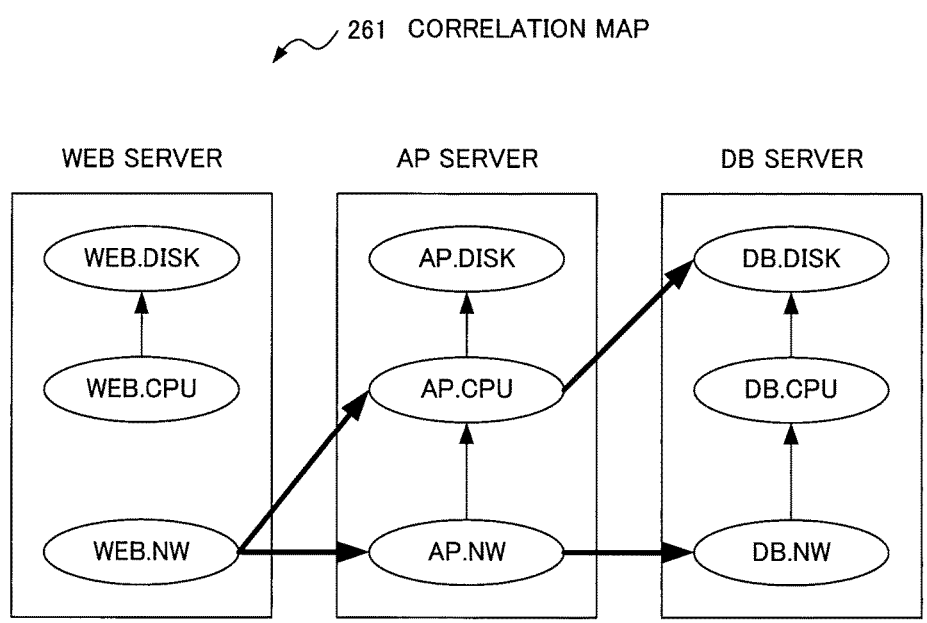
FIG. 10 is a chart illustrating an example of a correlation map 261 in the first exemplary embodiment of the present invention.

FIG. 10 is a chart illustrating an example of a correlation map 261 in the first exemplary embodiment of the present invention. The correlation map 261 of FIG. 10 corresponds to the correlation model 260 of FIG. 9. In the correlation map 261, the correlation model 260 is illustrated using a graph including nodes and an arrow. Each node indicates a metric and an arrow between metrics indicates a correlation from one to the other in two metrics.

Then, the benchmark performance comparison unit 104 determines a performance item for which a benchmark performance needs to be collected, based on the correlation model 260 of the migration-source processing system 250 (step S103). The benchmark performance comparison unit 104 determines a performance item regarding a metric having a correlation with another metric in the correlation model 260 as the performance item for which a benchmark performance needs to be collected. The benchmark performance comparison unit 104 instructs the benchmark performance collection unit 103 to acquire a benchmark performance regarding the performance item.

In the correlation model 260 of FIG. 9, for example, metrics "WEB.CPU", "WEB.DISK", and "WEB.NW" each have a correlation with another metric. In the same manner, metrics "AP.CPU", "AP.DISK", "AP.NW", "DB.CPU", "DB.DISK", and "DB.NW" each have a correlation with another metric. The benchmark performance comparison unit 104 determines performance items "CPU", "DISK", and "NW" regarding these metrics as performance items for which benchmark performances need to be collected.

The benchmark performance collection unit 103 acquires benchmark performances in a migration-source device and a migration-destination candidate device (step S104). The benchmark performance collection unit 103 acquires benchmark performances of a performance item instructed by the benchmark performance comparison unit 104.

The benchmark performance collection unit 103 acquires, for example, benchmark performances of the performance items "CPU", "DISK", and "NW" from the processing device 210 and the VM 320 of each device type. With respect to the performance item "NW", when the migration-source device or the migration-destination candidate device is a processing device, a data transmission/reception amount to/from another processing device is acquired. When the migration-source device or the migration-destination candidate device is a VM, a data transmission/reception amount to/from another processing device "NW (inter-device)" and a data transmission/reception amount to/from another VM "NW (inter-VM)" are acquired.

It is possible that the benchmark performance collection unit 103 acquires benchmark performances not for a performance item instructed by the benchmark performance comparison unit 104 but for a performance item previously determined by an administrator or the like.

Next, the benchmark performance comparison unit 104 calculates a ratio (benchmark performance ratio) of a benchmark performance of the migration-destination candidate device to a benchmark performance of the migration-source device with respect to each performance item (step S105). The benchmark performance comparison unit 104 sets the calculated benchmark performance ratio in the benchmark performance ratio information 124.

FIG. 11 is a chart illustrating an example of the benchmark performance ratio information 124 in the first exemplary embodiment of the present invention. The benchmark performance ratio information 124 includes a performance item, a benchmark performance ratio of the performance item, and a corrected performance ratio for each device type of the migration-source device and the migration-destination candidate device. The benchmark performance ratio information 124 further includes use and a price for each device type of the migration-destination candidate device.

In the example of FIG. 11, benchmark performances of the performance items "CPU" and "DISK" of the processing device 210 of a device type "R1" that is the migration-source device are "80" and "50", respectively. Benchmark performances of the metrics "CPU" and "DISK" in the VM 320 on a device type "VM-A" of the processing device 310 of a device type "S1" (hereinafter, referred to as the VM 320 of a device type "VM-A/S1") that is the migration-destination candidate device are "96" and "60", respectively, and benchmark performance ratios are "1.2" and "1.2", respectively.

The benchmark performance comparison unit 104 further calculates corrected performance ratios in which the benchmark performance ratios of the migration-source device and the migration-destination candidate device has been corrected based on the correlation model 260 (step S106). The benchmark performance comparison unit 104 sets the corrected performance ratios in the benchmark performance ratio information 124.

It is assumed that, in a state of operating a service system, a performance of one metric of a pair of metrics having a correlation in the correlation model 260 does not increase independently of a performance of the other metric, and a relationship between a performance ratio of a performance item regarding an input metric of the correlation and a performance ratio of a performance item regarding an output metric of the correlation is a relationship according to a coefficient of the correlation function.

The benchmark performance comparison unit 104 limits a ratio of the performance ratio of the performance item regarding the output metric of the correlation to the performance ratio of the performance item regarding the input metric of the correlation to a value of the coefficient of the correlation function. When a calculated value obtained by multiplying a benchmark performance ratio of the performance item regarding the input metric of the correlation by a coefficient α of the correlation function is equal to or smaller than a benchmark performance ratio of the performance item regarding the output metric of the correlation, the benchmark performance comparison unit 104 sets the calculated value as a corrected performance ratio of the performance item regarding the output metric. When the calculated value exceeds the benchmark performance ratio of the performance item regarding the output metric, the benchmark performance comparison unit 104 sets a value obtained by multiplying the benchmark performance ratio of the performance item regarding the output metric by a reciprocal of the coefficient a of the correlation function as a corrected performance ratio of the performance item regarding the input metric.

In the benchmark performance ratio information 124 of FIG. 11, corrected performance ratios calculated based on the correlation model 260 of FIG. 9 are set. In the correlation model 260 of FIG. 9, for example, a coefficient α of a correlation function with respect to an input metric "WEB.CPU" and an output metric "WEB.DISK" is "0.8". In the same manner, a coefficient α of a correlation function with respect to an input metric "AP.CPU" and an output metric "AP.DISK", and an input metric "DB.CPU" and an output metric "DB.DISK" is also "0.8". Therefore, the benchmark performance comparison unit 104 sets a value obtained by multiplying a benchmark performance ratio of the performance item "CPU" regarding the input metric by a coefficient α of the correlation function, "0.8", as a corrected performance ratio of the performance item "DISK" regarding the output metric, or the benchmark performance comparison unit 104 sets a value obtained by multiplying a benchmark performance ratio of the performance item "DISK" regarding the output metric by a reciprocal of the coefficient α of the correlation function, "1/0.8", as a corrected performance ratio of the performance item "CPU" regarding the input metric. As a result, in FIG. 11, for example, as the corrected performance ratio of the performance item "DISK" of the VM 320 of a device type "VM-A/S1", "0.96" obtained by multiplying the benchmark performance ratio of the performance item "CPU" by a coefficient α "0.8" is set.

It is conceivable that also in the migration-source processing system 250, in a state of operating a service system, a ratio of a performance ratio of a performance item regarding an output metric of a correlation to a performance ratio of a performance item regarding an input metric of the correlation is limited to a value of a coefficient of the correlation function. Therefore, it is possible that the benchmark performance comparison unit 104 further calculates a corrected performance ratio based on a coefficient of a correlation function in the correlation model 260 also with respect to a benchmark performance ratio in a migration-source device to be a reference and sets the calculated ratio in the benchmark performance ratio information 124. In FIG. 11, for example, as a corrected performance ratio of the performance item "DISK" of the migration-source device, "0.8" obtained by multiplying a benchmark performance ratio of the performance item "CPU" by a coefficient α "0.8" is set.

Next, the analysis unit 106 generates a plan of the migration-destination processing system 350 based on the server characteristic information 400 and the benchmark performance ratio information 124 and presents the generated plan to the administrator or the like (step S107). For example, for a server having a large load with respect to a given performance item in the server characteristic information 400, the analysis unit 106 selects a migration-destination candidate device in which a benchmark performance ratio (corrected performance ratio) of the performance item is large in the benchmark performance ratio information 124.

Figure 12:
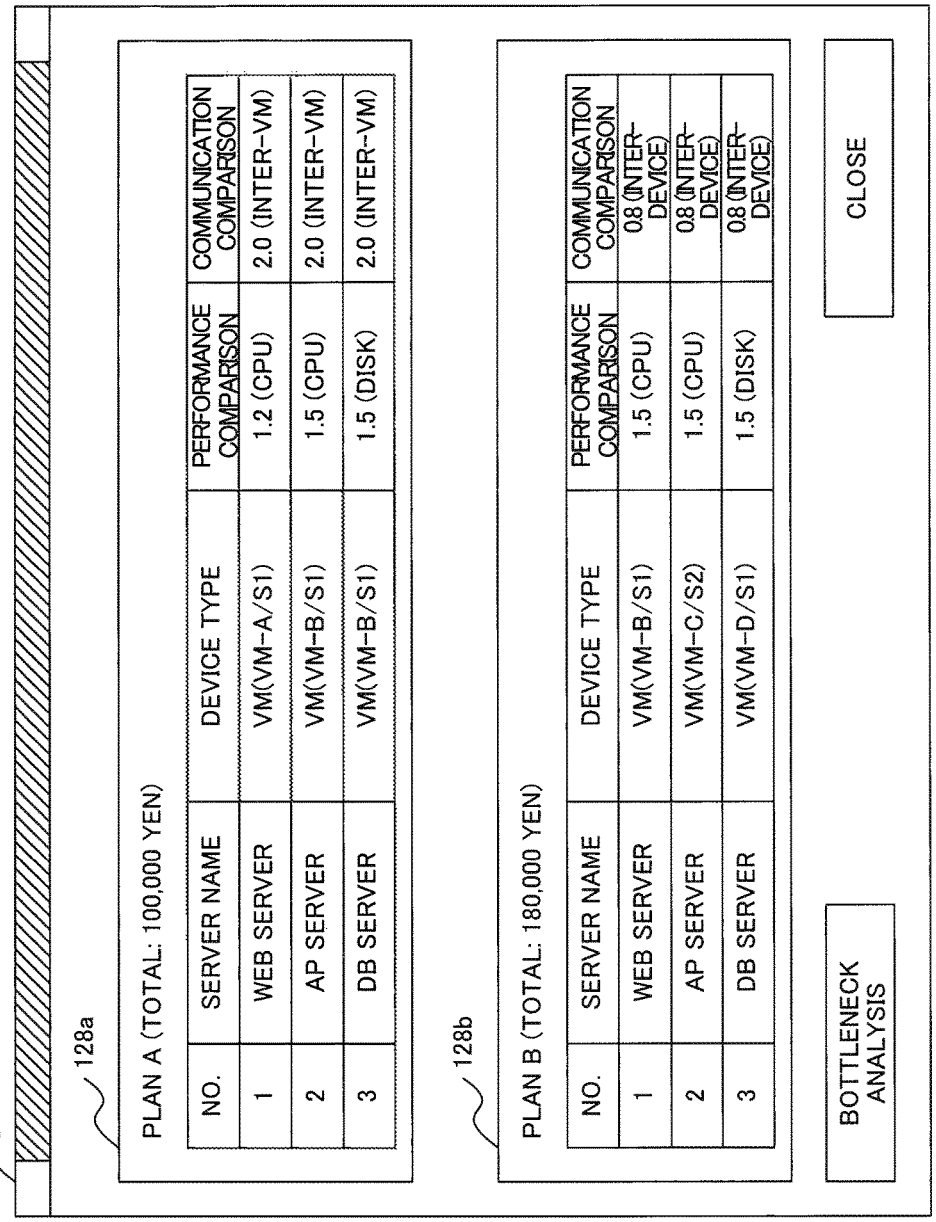
FIG. 12 is a chart illustrating an example of a display screen 126 of a plan of the migration-destination processing system 350 in the first exemplary embodiment of the present invention.

FIG. 12 is a chart illustrating an example of a display screen 126 of a plan of the migration-destination processing system 350 in the first exemplary embodiment of the present invention. FIG. 12 illustrates the display screen 126 generated based on the server characteristic information 400 of FIG. 6 and the benchmark performance ratio information 124 of FIG. 11. The display screen 126 includes plans 128 (128a and 128b).

Each plan 128 includes a price of the plan as well as a device type, a performance comparison, and a communication comparison with respect to each server. The device type indicates a device type of a selected migration-destination candidate device. The performance comparison indicates a performance item used for selecting each device type and a benchmark performance ratio (corrected performance ratio) of the performance item. The communication comparison indicates a benchmark performance ratio (corrected performance ratio) of the performance item "NW".

The example of FIG. 12 presents two plans that are the plan 128a (plan A) and the plan 128b (plan B).

In the plan 128a (plan A), as migration-destination candidate devices of the WEB server, the AP server, and the DB server, the VMs 320 of device types "VM-A/S1", "VM-B/S1", and "VM-B/S1" are selected respectively. Further, in the plan 128b (plan B), as migration-destination candidate devices of the WEB server, the AP server, and the DB server, the VMs 320 of device types "VM-B/S1", "VM-C/S2", and "VM-D/S1" are selected respectively.

Figure 4:
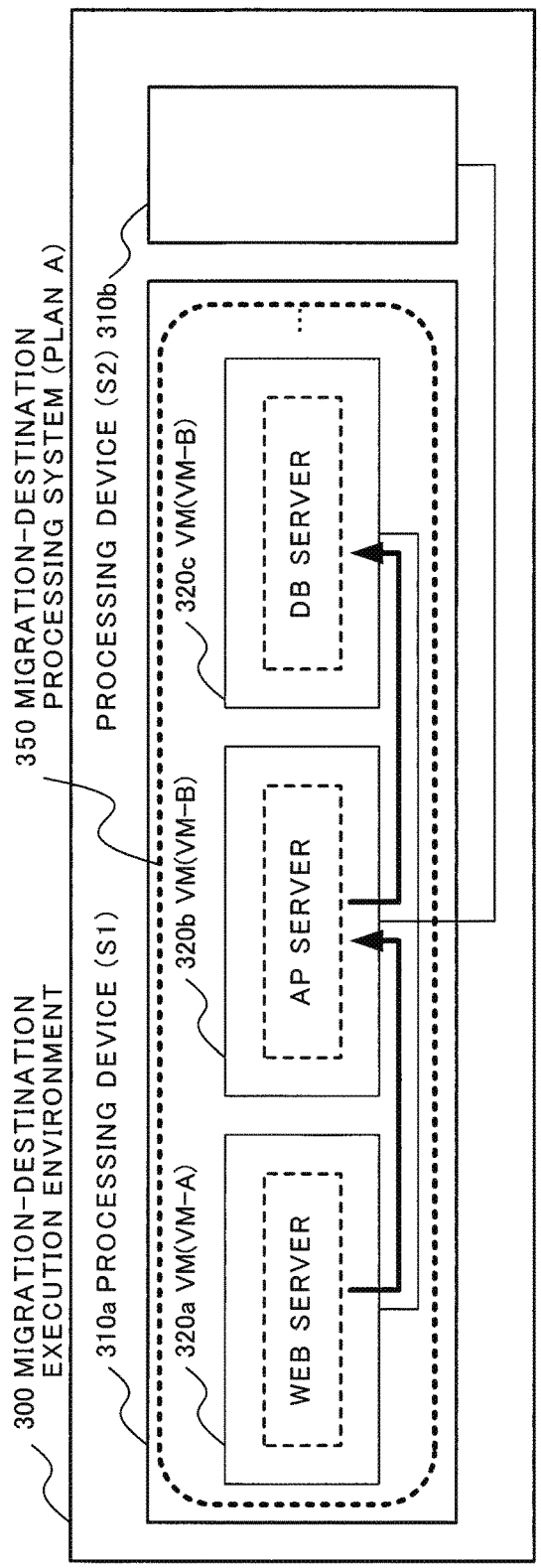
FIG. 4 is a block diagram illustrating a configuration example of a migration-destination processing system 350 in the first exemplary embodiment of the present invention.
Figure 5:
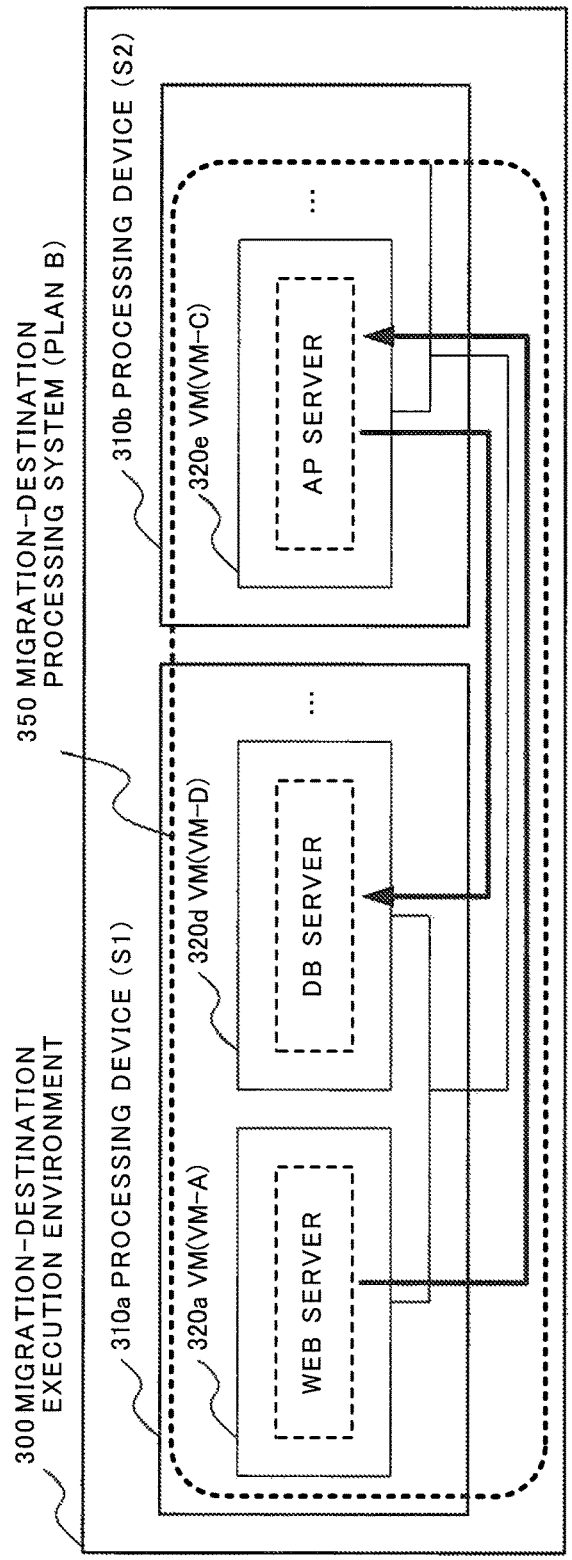
FIG. 5 is a block diagram illustrating another configuration example of the migration-destination processing system 350 in the first exemplary embodiment of the present invention.

FIG. 4 and FIG. 5 each are a block diagram illustrating a configuration example of the migration-destination processing system 350 in the first exemplary embodiment of the present invention. FIG. 4 illustrates an example of the migration-destination processing system 350 configured in accordance with the plan 128a (plan A) and FIG. 5 illustrates an example of the migration-destination processing system 350 configured in accordance with the plan 128b (plan B).

In the plan 128a (plan A), the WEB server, the AP server, and the DB server are disposed in the VMs 320 on the same processing devices 310 of a device type "S1". For this reason, communications between the servers are performed between the VMs 320. Therefore, as the communication comparison of the plan 128a (plan A) of FIG. 12, the benchmark performance ratio (corrected performance ratio) of the performance item "NW (inter-VM)" in the benchmark performance ratio information 124 of FIG. 11 is indicated. On the other hand, in the plan 128b (plan B), the WEB server and the DB server are disposed in the VMs 320 on the processing devices 310 of a device type "S1" and the WEB server is disposed in the VM 320 on the processing device 310 of a device type "S2". For this reason, communications between the WEB server and the AP server and communications between the AP server and the DB server are performed between the processing devices 320. Therefore, as the communication comparison of the plan 128b (plan B) of FIG. 12, the benchmark performance ratio (corrected performance ratio) of the performance item "NW (inter-device)" in the benchmark performance ratio information 124 of FIG. 11 is indicated.

In FIG. 12, in the performance comparison of the plan 128a (plan A), performances of "CPU" of the WEB server, "CPU" of the AP server, and "DISK" of the DB server are increased to "1.2 times", "1.5 times", and "1.5 times", respectively. Further, in the communication comparison, a performance of "NW(inter-VM)" of each server is also increased to "2.0 times". On the other hand, in the performance comparison of the plan 128b (plan B), performances of "CPU" of the WEB server, "CPU" of the AP server, and "DISK" of the DB server are increased to "1.5 times", "1.5 times", and "1.5 times", respectively. However, in the communication comparison, a performance of "NW(inter-device)" of each server is decreased to "0.8 times".

Then, the prediction model generation unit 105 generates a prediction model 370 for the migration-destination processing system 350 configured based on the presented plan (step S108).

It is conceivable that a decrease in a communication performance between servers of the migration-destination processing system 350 compared with the migration-source processing system 250 also affects a correlation between the servers.

For example, in the plan 128b (plan B) of FIG. 12, the communication performance of each server is decreased to "0.8 times". This decrease in the communication performance affects correlations between the metrics "WEB.NW"

and "AP.NW" and between the metrics "AP.NW" and "DB.NW" that are correlations indicating a communication performance between servers. Further, the decrease also affects correlations between the metrics "WEB.NW" and "AP.CPU" and between the metrics "AP.CPU" and "DB.DISK" that are other correlations between servers.

In the first exemplary embodiment of the present invention, it is assumed that a coefficient of a correlation function indicating a communication performance between servers in a correlation model of the migration-destination processing system 350 is represented by a value obtained by multiplying a coefficient of a corresponding correlation in the correlation model 260 of the migration-source processing system 250 by a benchmark performance ratio regarding an input metric of the correlation.

The prediction model generation unit 105 multiplies a coefficient of a correlation between metrics indicating a communication performance between servers in the correlation model 260 by a benchmark performance ratio (corrected performance ratio) regarding an input metric of the correlation to generate the prediction model 370.

Figure 13:
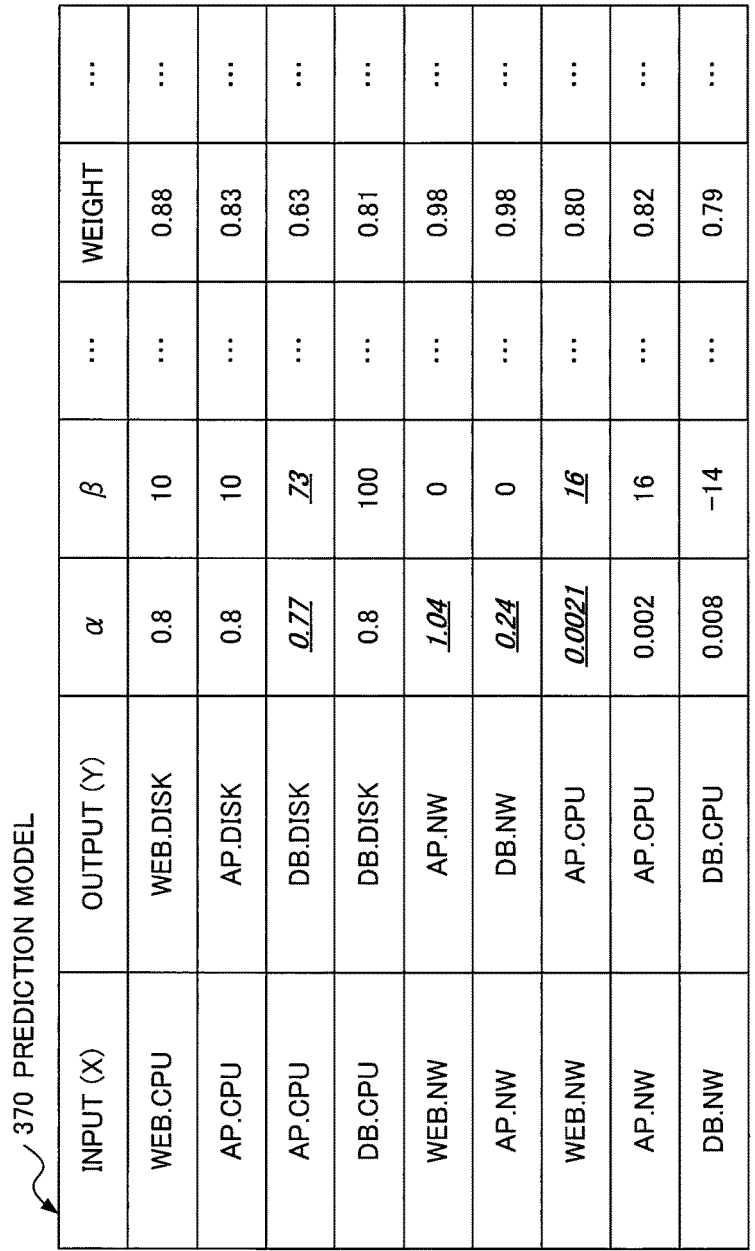
FIG. 13 is a chart illustrating an example of a prediction model 370 in the first exemplary embodiment of the present invention.

FIG. 13 is a chart illustrating an example of the prediction model 370 in the first exemplary embodiment of the present invention. FIG. 13 illustrates the prediction model 370 of the migration-destination processing system 350 of the plan 128b (plan B) of FIG. 12.

In the prediction model 370 of FIG. 13, for example, as a coefficient α of a correlation function between the metrics "WEB.NW" and "AP.NW", "1.04" obtained by multiplying a coefficient α of "1.3" of a corresponding correlation function in the correlation model 260 by a performance ratio of "0.8" of "NW (inter-device)" of the WEB server is set. In the same manner, as a coefficient α of a correlation function between the metrics "AP.NW" and "DB.NW", "0.24" obtained by multiplying a coefficient α of "0.3" of a corresponding correlation function in the correlation model 260 by a performance ratio of "0.8" of "NW (inter-device)" of the AP server is set. In conformity to these coefficients, coefficients α and β of other correlations between servers are also changed. For example, coefficients α and β of a correlation function between the metrics "WEB.NW" and "AP.CPU" are calculated using the calculated correlation function between the metrics "WEB.NW" and "AP.NW" and a correlation function between the metrics "AP.NW" and "AP.CPU" in the correlation model 260.

The prediction model generation unit 105 may output the generated prediction model 370 to the administrator or the like.

The analysis unit 106 predicts a value of each metric in a state of operating a service system in the migration-destination processing system 350 using the prediction model 370 (step S109).

The analysis unit 106 designates a predetermined value as a value of a specific metric included in the prediction model 370 and calculates a value of another metric having a correlation with the metric using a correlation function of the correlation. In the same manner, the analysis unit 106 further calculates sequentially a value of another metric having a correlation with the value-calculated metric. The analysis unit 106 may determine whether the calculated value of a metric exceeds a predetermined limit value set for the metric.

In the same manner, the analysis unit 106 predicts a value of each metric in a state of operating a service system in the migration-source processing system 250 using the correlation model 260 (step S110).

The analysis unit 106 calculates a prediction performance ratio that is a ratio of a prediction value (migration-destination prediction value) of a metric in the migration-destination processing system 350 to a prediction value (migration-source prediction value) of a metric in the migration-source processing system 250 with respect to each metric (step S111). The analysis unit 106 sets the calculated prediction performance ratio in the prediction performance ratio information 129.

FIG. 14 is a chart illustrating an example of the prediction performance ratio information 129 in the first exemplary embodiment of the present invention. The prediction performance ratio information 129 of FIG. 14 indicates a prediction performance ratio calculated based on the correlation model 260 of FIG. 9 and the prediction model 370 of FIG. 13. The prediction performance ratio information 129 includes a migration-source prediction value, a migration-destination prediction value, and a prediction performance ratio for each performance item (metric) of each server. The example of FIG. 14 indicates a migration-source prediction value, a migration-destination prediction value, and a prediction performance ratio of another metric in which, as a value of the metric "WEB.NW", "24000" is designated. For example, a migration-source prediction value, a migration-destination prediction value, and a prediction performance ratio of the metric "AP.CPU" are "78.4", "65.9", and "0.84", respectively and a performance of the migration-destination processing system 350 is decreased compared with that of the migration-source processing system 250.

The analysis unit 106 corrects the plan of the migration-destination processing system 350 based on the prediction performance ratio information 129 and presents the corrected plan to the administrator or the like (step S112). The analysis unit 106 presents values obtained by multiplying values of benchmark performance ratios (corrected performance ratios) presented as the performance comparison and the communication comparison in the plan 128 of the display screen 126 by corresponding prediction performance ratios, respectively, as values of a performance comparison and a communication comparison after correction.

Figure 15:
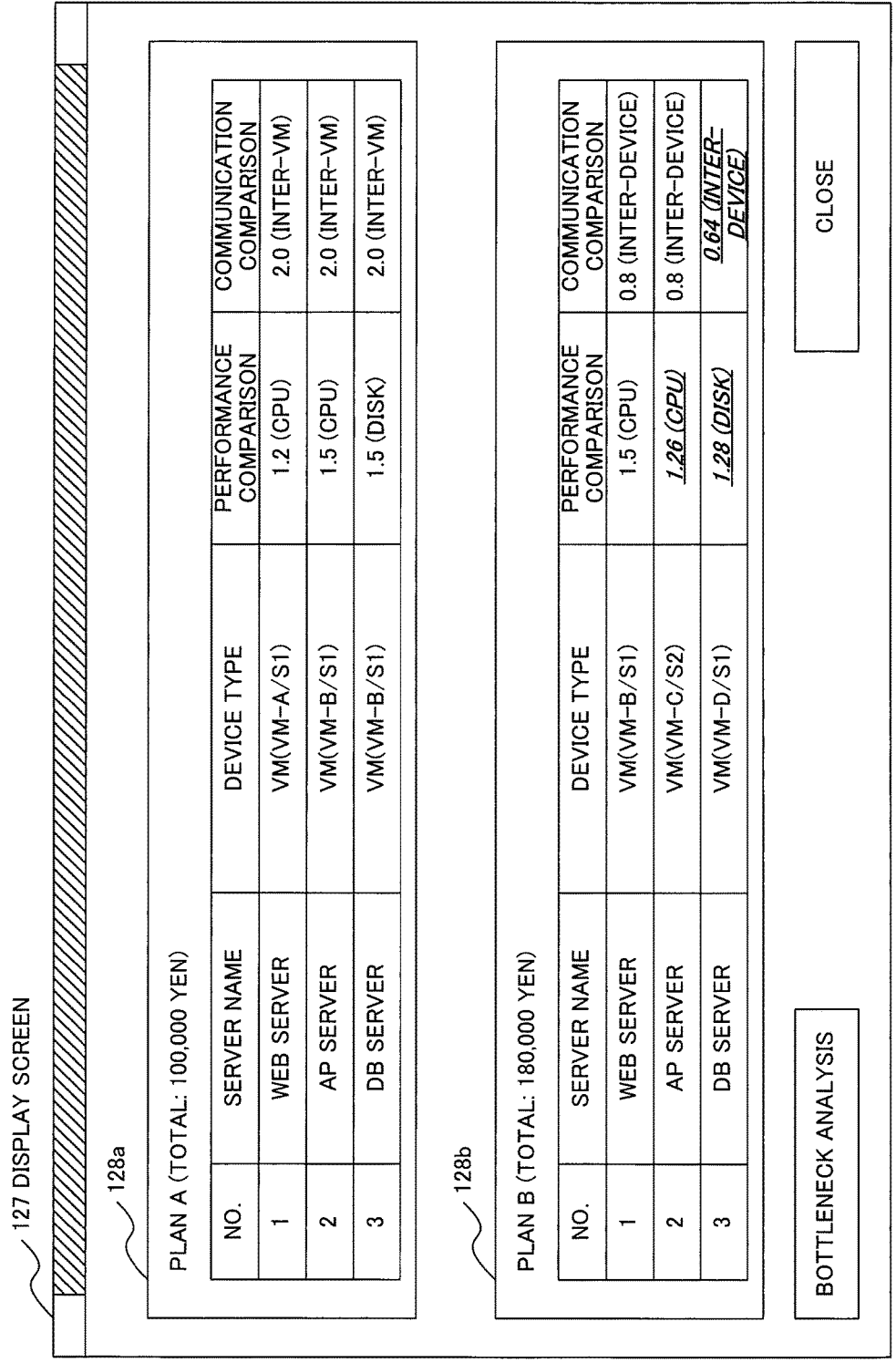
FIG. 15 is a chart illustrating an example of a display screen 127 of a plan of the migration-destination processing system 350 in the first exemplary embodiment of the present invention.

FIG. 15 is a chart illustrating an example of a display screen 127 of a plan of the migration-destination processing system 350 in the first exemplary embodiment of the present invention. The display screen 127 of FIG. 15 indicates results in which the plan 128b (plan B) of FIG. 12 has been corrected based on the prediction performance ratio information 129 of FIG. 14. The display screen 127 is displayed when, for example, the pan 128b (plan B) is selected in the display screen 126 and a button of "bottleneck analysis" is pushed. In the display screen 127, for example, as a value of the performance comparison of the AP server, there is set "1.26 (CPU)" obtained by multiplying a value of the performance comparison "1.5 (CPU)" in the display screen 126 by a prediction performance ratio "0.84". In the same manner, values of the performance comparison and the communication comparison of the DB server are also corrected.

From the display screen 127 of FIG. 15, the administrator can discern that the plan 128b (plan B) is lower in performance and higher in price than the plan 128a (plan A). Then, the administrator selects, for example, the plan 128a (plan A) as the migration-destination processing system 350. As a result, in the migration-destination execution environment 300, the migration-destination processing system 350 as illustrated in FIG. 4 is constructed. This makes it possible to prevent a decrease in communication performance and occurrence of a bottleneck due to a disposition method of the VM 320 upon construction of the migration-destination processing system 350 (FIG. 5) of the plan 128b (plan B) and then to select a plan having good cost performance.

As described above, the operation of the first exemplary embodiment of the present invention is completed.

Figure 1:
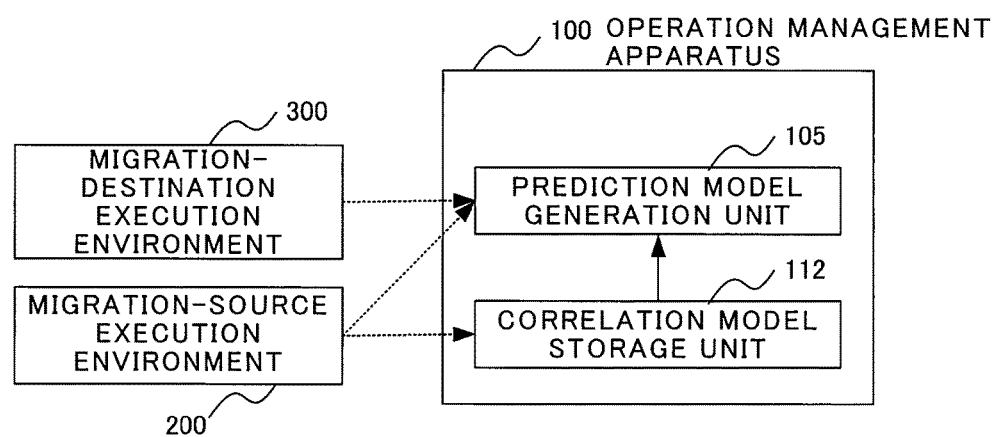
FIG. 1 is a block diagram illustrating a characteristic configuration of a first exemplary embodiment of the present invention.

Next, a characteristic configuration of the first exemplary embodiment of the present invention will be described. FIG. 1 is a block diagram illustrating a characteristic configuration of the first exemplary embodiment of the present invention.

With reference to FIG. 1, an operation management apparatus 100 includes a correlation model storage unit 112 and a prediction model generation unit 105.

The correlation model storage unit 112 stores a correlation model 260 indicating a correlation for each pair of one or more metrics in a state of executing a predetermined program processing in a first processing system.

The prediction model generation unit 105 generates, by correcting the correlation model 260 of the first processing system using benchmark performances acquired in a state of executing a predetermined benchmark processing in the first processing system and a second processing system which is different from the first processing system, a prediction model 370 of a correlation model in a state of executing the predetermined program processing in the second processing system.

Next, an advantageous effect of the first exemplary embodiment of the present invention is described below.

The first exemplary embodiment of the present invention makes it possible to discern a bottleneck of a system in an execution environment of a migration-destination without operating the system in the execution environment of the migration-destination. The reason is that the prediction model generation unit 105 generates the prediction model 370 of the migration-destination processing system 350 by correcting the correlation model 260 of the migration-source processing system 250 using benchmark performances of the migration-source processing system 250 and the migration-destination processing system 350.

This makes it possible to discern, before migration, a detailed bottleneck according to a configuration of the migration-destination processing system 350, such as a server disposition of the migration-destination and the like. Therefore, it is possible to markedly reduce occurrence of performance failures after migration and then to enhance reliability and availability of a service system.

The first exemplary embodiment of the present invention makes it possible to confirm a value in the execution environment of the migration-destination with respect to a performance item in which no benchmark performance is acquired. The reason is that the prediction model generation unit 105 generates the prediction model 370 of the migration-destination processing system 350 based on the correlation model 260 of the migration-source processing system 250. When the correlation model 260 of the migration-source processing system 250 is generated using a measured value of the performance item in which no benchmark performance is acquired and includes a correlation regarding the performance item, a value of the performance item can be confirmed using the prediction model 370. This makes it possible to perform characteristic evaluations for a large number of performance items in the migration-destination processing system 350 without increasing a workload for collecting benchmark performances.

The first exemplary embodiment of the present invention has described a simple example in which the prediction model generation unit 105 corrects coefficients of a correlation function ($Y=\alpha X+\beta$) but the present invention is not limited to this example. When it is possible that the correlation function is modified according to an influence of a partial performance decrease detected by the migration-destination processing system 350, the prediction model generation unit 105 may correct a correlation function of another form. As the correlation function, for example, using an equation capable of expressing a parameter such as time delay and the like, the prediction model generation unit 105 may generate the prediction model 370 reflected with an influence of a communication response delay, communication flow control, or the like.

The first exemplary embodiment of the present invention has multiplied coefficients of a correlation indicating a communication performance between servers by a benchmark performance ratio regarding an input metric of the correlation to correct a correlation function, but when it is possible to correct the coefficients using a benchmark performance, a correction may be performed using another method.

(Second Exemplary Embodiment)

Next, a second exemplary embodiment of the present invention will be described below.

The second exemplary embodiment of the present invention is different from the first exemplary embodiment of the present invention in that a prediction error between a correlation model 360 and the prediction model 370 of a migration-destination system is calculated.

Figure 16:
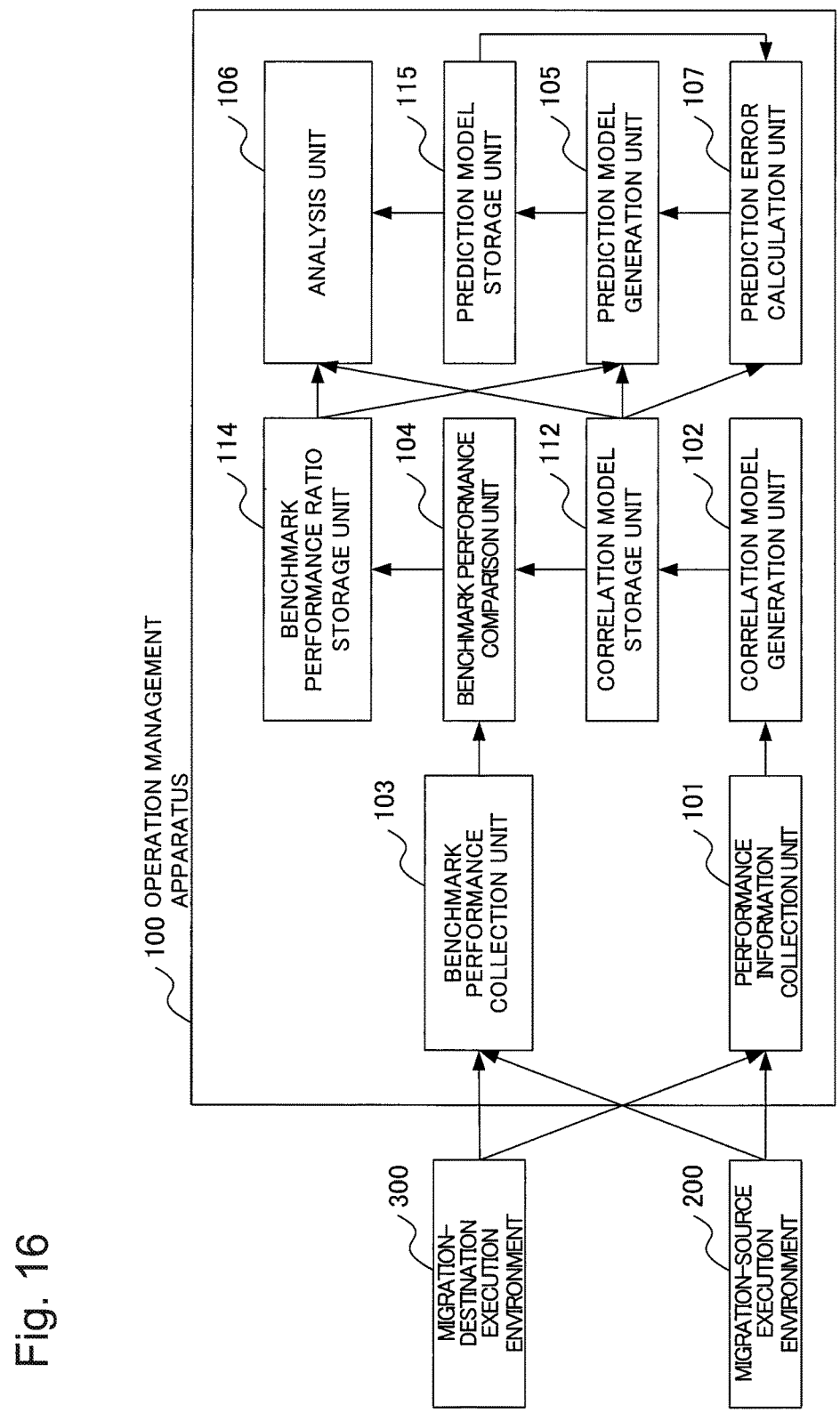
FIG. 16 is a block diagram illustrating a configuration of an operation management system including an operation management apparatus 100 in a second exemplary embodiment of the present invention.

Initially, a configuration of an operation management apparatus 100 in the second exemplary embodiment of the present invention is described. FIG. 16 is a block diagram illustrating a configuration of an operation management system including the operation management apparatus 100 in the second exemplary embodiment of the present invention. Referring to FIG. 16, the operation management apparatus 100 in the second exemplary embodiment of the present invention further includes a prediction error calculation unit 107 in addition to the components of the operation management apparatus 100 in the first exemplary embodiment of the present invention.

The performance information collection unit 101 collects performance information in a state of operating a service system in the migration-destination processing system 350, in addition to the collection of performance information of the migration-source processing system 250. The correlation model generation unit 102 generates the correlation model 360 of the migration-destination processing system 350, in addition to the correlation model 260 of the migration-source processing system 250. The correlation model storage unit 112 stores the correlation model 360, in addition to the correlation model 260.

The prediction error calculation unit 107 calculates a prediction error (model prediction error) between the correlation model 360 and the prediction model 370 of the migration-destination processing system 350.

The prediction model generation unit 105 corrects the prediction model 370 using the prediction error.

Next, an operation of the operation management apparatus 100 in the second exemplary embodiment of the present invention will be described.

Figure 17:
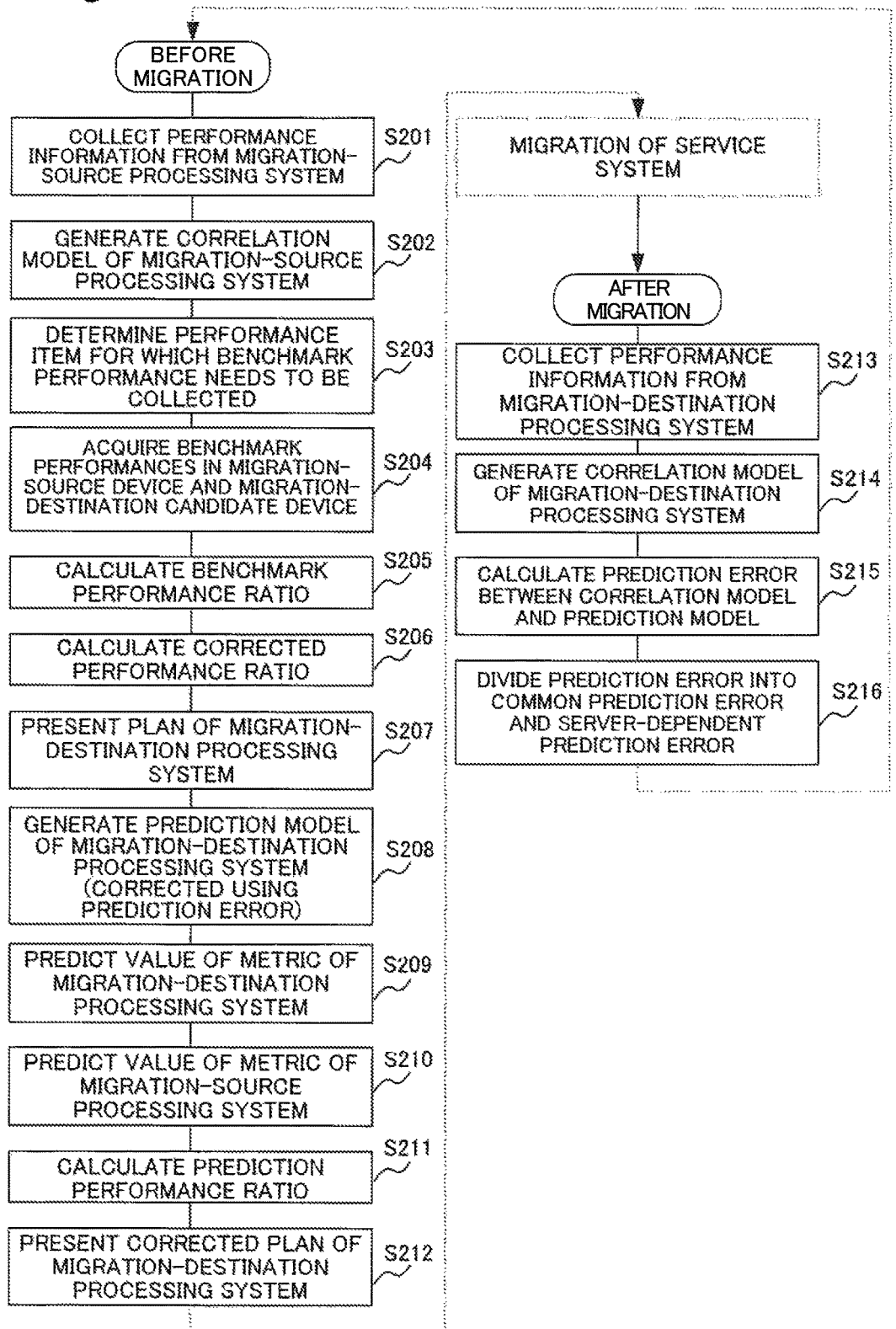
FIG. 17 is a flowchart illustrating processing of the operation management apparatus 100 in the second exemplary embodiment of the present invention.

FIG. 17 is a flowchart illustrating processing of the operation management apparatus 100 in the second exemplary embodiment of the present invention.

Operations (steps S201 to S212) leading to presentation of a corrected plan of the migration-destination processing system 350 are the same as operations (steps S101 to S112) of the first exemplary embodiment of the present invention except step S208.

It is assumed that in the migration-destination execution environment 300, the migration-destination processing system 350 has been constructed in accordance with a plan selected by the administrator.

The performance information collection unit 101 collects performance information from a migration-destination device in a state of operating a service system in the migration-destination processing system 350 (step S213). The correlation model generation unit 102 generates the correlation model 360 of the migration-destination processing system 350 (step S214). The correlation model generation unit 102 stores the generated correlation model 360 in the correlation model storage unit 112.

The prediction error calculation unit 107 compares a correlation function of the correlation model 360 and a correlation function of the prediction model 370 and calculates a prediction error between the correlation model 360 and the prediction model 370 (step S215). The prediction error calculation unit 107 divides the calculated prediction error into a prediction error common to respective servers of the same migration-destination processing system 350 (common prediction error) and a prediction error depending on a specific server (server-dependent prediction error) (step S216).

The prediction error calculation unit 107 calculates prediction errors with respect to correlations between performance items common among servers (common correlations), such as a correlation between the metrics "WEB.CPU" and "WEB.DISK", a correlation between the metrics "AP.CPU" and "AP.DISK", and a correlation between the metrics "DB.CPU" and "DB.DISK".

For example, coefficients of correlation functions of common correlations of the WEB server, the AP server, and the DB server of the correlation model 360 are designated as ($\alpha wc$, $\beta wc$), ($\alpha ac$, $\beta ac$), and ($\alpha dc$, $\beta dc$), respectively. Further, coefficients of correlation functions of common correlations of the WEB server, the AP server, and the DB server of the prediction model 370 are designated as ($\alpha we$, $\beta we$), ($\alpha ae$, $\beta ae$), and ($\alpha de$, $\beta de$), respectively. In this case, the prediction error calculation unit 107 calculates prediction errors ($\Delta\alpha w$, $\Delta\beta w$), ($\Delta\alpha a$, $\Delta\beta a$), and ($\Delta\alpha d$, $\Delta\beta d$) of coefficients ($\alpha$, $\beta$) in the respective servers, for example, using equation Math. 1.

$$\Delta\alpha w = \alpha wc - \alpha we, \Delta\beta w = \beta wc - \beta we$$

$$\Delta\alpha a = \alpha ac - \alpha ae, \Delta\beta a = \beta ac - \beta ae$$

$$\Delta\alpha d = \alpha dc - \alpha de, \Delta\beta d = \beta dc - \beta de \qquad [\text{Math. 1}]$$

When the prediction errors of the respective servers are substantially equal, these prediction errors are conceivable as a prediction error generated commonly in the respective servers (common prediction error). When a prediction error of a given server is different from a prediction error of the other server to a large extent, the prediction error of the server is conceivable as a prediction error depending on characteristics of an operation executed by the server (server-dependent prediction error).

When, for example, the prediction errors ($\Delta\alpha a$, $\Delta\beta a$) and ($\Delta\alpha d$, $\Delta\beta d$) of the AP server and the DB server are prediction errors ($\Delta\alpha$, $\Delta\beta$) of a substantially equal extent, the prediction error calculation unit 107 determines the prediction errors ($\Delta\alpha$, $\Delta\beta$) as common prediction errors.

When the prediction errors ($\Delta\alpha aw$, $\Delta\beta w$) of the WEB server are different from prediction errors of the AP server and the DB server to a large extent, the prediction error calculation unit 107 determines the prediction errors ($\Delta\alpha w$, $\Delta\beta w$) as server-dependent prediction errors of the WEB server.

Thereafter, when a service system is migrated in accordance with processing from step S201, in step S208, the prediction model generation unit 105 corrects a new prediction model 370 generated based on the correlation model 260 and the benchmark performance ratio information 124, using the prediction errors.

When a service system to be a migration target includes a new server and also the migration-destination processing system 350 is the same as the migration-destination processing system 350 upon calculating prediction errors, the prediction model generation unit 105 corrects a common correlation of the new server using a common prediction error.

For example, coefficients of a correlation function of the common correlation of a server X in the new prediction model 370 are designated as ($\alpha xe$, $\beta xe$). In this case, the prediction model generation unit 105 corrects the coefficients ($\alpha xe$, $\beta xe$) using the common prediction errors ($\Delta\alpha$, $\Delta\beta$), for example, as in equation Math. 2.

$$\alpha xe\_new = \alpha xe \times \Delta\alpha, \ \beta xe\_new = \beta xe + \Delta\beta \qquad [\text{Math. 2}]$$

When a service system to be a migration target includes a server in which a server-dependent prediction error has been calculated and also the migration-destination processing system 350 is different from the migration-destination processing system 350 upon calculating a server-dependent prediction error, the prediction model generation unit 105 corrects a common correlation of the server using the server-dependent prediction error.

For example, coefficients of a correlation function of the WEB server in the new prediction model 370 are designated as ($\alpha'we$, $\beta'we$). In this case, the prediction model generation unit 105 corrects the coefficients ($\alpha'we$, $\beta'we$) using the server-dependent prediction errors ($\Delta\alpha w$, $\Delta\beta w$) of the WEB server, for example, as in equation Math. 3.

$$\alpha'we\_new = \alpha'we \times \Delta\alpha w, \ \beta'we\_new = \beta'we + \Delta\beta w \qquad [\text{Math. 3}]$$

The prediction error calculation unit 107 may calculate prediction errors with respect to correlations between performance items common between pairs (couples) of servers, such as a correlation between the metrics "WEB.NW" and "AP.NW", a correlation between the metrics "AP.NW" and "DB.NW", and the like. In this case, the prediction error calculation unit 107 calculates, for example, a prediction error common to pairs of servers (common prediction error) and a prediction error depending on a specific pair of servers (server pair-dependent prediction error). The prediction error calculation unit 107 corrects correlations for pairs of servers using the common prediction error or alternatively, corrects a correlation for a specific pair of servers using the server pair-dependent prediction error.

As described above, the operation of the second exemplary embodiment of the present invention is completed.

Next, an advantageous effect of the second exemplary embodiment of the present invention is described below.

The second exemplary embodiment of the present invention makes it possible to enhance an accuracy of a prediction of the prediction model 370, compared with the first exemplary embodiment. The reason is that the prediction error calculation unit 107 calculates a prediction error between the correlation model 360 and the prediction model 370 of the migration-destination processing system 350 and the prediction model generation unit 105 corrects the prediction model 370 using the prediction error.

When a migration of a service system is determined using a benchmark performance as in PTL 3, there has been a problem in which after the migration, it is difficult to determine whether a performance of the migration-destination processing system 350 is a performance as expected.

The second exemplary embodiment of the present invention makes it possible to verify, after migration, whether the performance of the migration-destination processing system 350 is a performance as expected. The reason is that the prediction error calculation unit 107 compares the prediction model 370 generated before migration of a service system and the correlation model 360 generated after migration and then calculates a prediction error.

The second exemplary embodiment of the present invention makes it possible to generate an accurate prediction model 370 according to a migration-destination and the presence or absence of a specific server. The reason is that the prediction error calculation unit 107 compares prediction errors with respect to performance correlations between servers and divides the prediction errors into a common prediction error and a server-dependent prediction error. This makes it possible to correct the prediction model 370 using an appropriate prediction error according to a migration-destination and the presence or absence of a specific server.

The second exemplary embodiment of the present invention makes it possible to generate an appropriate prediction model 370 in conformity to a usage situation after migration even when a usage situation of a service system tends to change before and after migration. The reason is that the prediction error calculation unit 107 calculates a prediction error between the correlation model 360 and the prediction model 370 in a state of operating an actual service system after migration, and the prediction model generation unit 105 corrects the prediction model 370 using the prediction error.

When, for example, due to integration or scale enlargement of a system, a service system is migrated from a physical processing device onto a VM, a processing load thereof tends to increase after migration, compared with before migration. Therefore, when a performance of the migration-destination processing system 350 is estimated by assuming the same processing load after and before migration, it is highly possible that a bottleneck is actualized on the migration-destination processing system 350 after migration. When determining a migration of a service system using a benchmark performance as in PTL 3, it has been difficult to predict a change due to an external factor upon such practical operation. Therefore, it has been necessary to cause the migration-destination processing system 350 to include excessive surplus resources or alternatively, necessary to determine surplus resources of the migration-destination processing system 350 based on the experience and intuition of an administrator with advanced knowledge.

In contrast, the second exemplary embodiment of the present invention reflects a prediction error between the correlation model 360 and the prediction model 370 after migration in a subsequent prediction model 370. Therefore, when, for example, the processing load tends to increase after migration, using the prediction model 370 in which the above matter is taken into account, a performance of the migration-destination processing system 350 is estimated. This makes it possible to respond to a change due to an external factor upon practical operation and thereby, a performance estimation result according to the practical operation can be obtained.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2012-254389, filed on Nov. 20, 2012, the disclosure of which is incorporated herein in its entirety by reference.

REFERENCE SIGNS LIST

100 operation management apparatus
101 performance information collection unit
102 correlation model generation unit
103 benchmark performance collection unit
104 benchmark performance comparison unit
105 prediction model generation unit
106 analysis unit
107 prediction error calculation unit
112 correlation model storage unit
114 benchmark performance ratio storage unit
115 prediction model storage unit
124 benchmark performance ratio information
126 display screen
127 display screen
128 plan
129 prediction performance ratio information
200 migration-source execution environment
210 processing device
250 migration-source processing system
260 correlation model
261 correlation map
300 migration-destination execution environment
310 processing device
320 VM
350 migration-destination processing system
360 correlation model
370 prediction model
400 server characteristic information

What is claimed is:

1. An operation management apparatus for migration of a system constructed in a source processing system to one of a plurality of destination processing systems, the system being constructed by disposing a predetermined program, comprising:
a memory storing instructions, and
one or more processors configured to execute the instructions to:
store a correlation model for a state of executing the predetermined program in the source processing system, the correlation model indicating a correlation between each pair of one or more metrics of the system;
generate, for each of the plurality of destination processing systems, by correcting the correlation model for the source processing system using benchmark performances of the one or more metrics acquired in a state of executing a predetermined benchmark program in the source processing system and the destination processing system, a prediction model of the correlation model for a state of executing the predetermined program in the destination processing system;

calculate, for each of the plurality of destination processing systems, a predicted performance ratio of the destination processing system to the source processing system for a state of executing the predetermined program by using the generated prediction model, without executing the predetermined program in the destination processing system; and constructs the system by disposing the predetermined program in a destination processing system selected from the plurality of destination processing systems based on predicted performance ratios calculated for the plurality of destination processing systems, the system being migrated from the source processing system to the selected destination processing system, wherein the predetermined program includes programs for a plurality of servers, and the correlation model for the source processing system is corrected by calculating a benchmark performance ratio that is a ratio of a benchmark performance of a metric indicating a communication performance between servers in the destination processing system to a benchmark performance of the metric in the source processing system, and multiplying a correlation coefficient of a correlation function indicating a correlation between the servers in the correlation model by the calculated benchmark performance ratio, and migration of the system including the predetermined program from the source processing system is improved by selecting the selected destination processing to which the system is migrated, resulting from construction of the system.

2. The operation management apparatus according to claim 1, wherein a correlation coefficient of a correlation function in which a metric of a first server and a metric of a second server are designated as an input and an output, respectively, in the correlation model of the source processing system is multiplied by a benchmark performance ratio regarding a communication between the first server and the second server.

3. The operation management apparatus according to claim 1, wherein the one or more processors configured to further execute the instructions to:

predict a value of a second metric with respect to a value of a first metric among the one or more metrics for a state of executing the predetermined program in the destination processing system, using the prediction model of the destination processing system.

4. The operation management apparatus according to claim 3, wherein the one or more processors configured to further execute the instructions to:

predict a value of the second metric with respect to a value of the first metric for a state of executing the predetermined program in the source processing system, using the correlation model of the source processing system, and predict a performance ratio of the destination processing system to the source processing system for a state of executing the predetermined program on the basis of the predicted values of the second metric in the source processing system and the destination processing system.

5. The operation management apparatus according to claim 1, wherein the one or more processors configured to further execute the instructions to:

store a correlation model of the destination processing system that is the correlation model for a state of executing the predetermined program in the destination processing system, and calculate a model prediction error between the correlation model of the destination processing system and the prediction model of the destination processing system.

6. The operation management apparatus according to claim 5, wherein the one or more processors configured to further execute the instructions to:

correct the prediction model of the destination processing system, using the model prediction error.

7. The operation management apparatus according to claim 6, wherein the predetermined program includes programs for a plurality of servers, and the one or more processors configured to further execute the instructions to:

divide a model prediction error of a correlation between metrics regarding common performance items in the plurality of servers into a prediction error common to the plurality of servers and a prediction error depending on a specific server, apply, upon generating a prediction model for a state of executing programs including a program for a new server different from the plurality of servers, the prediction error common to the plurality of servers to the correlation between metrics regarding the common performance items of the new server, and apply, upon generating a prediction model for a state of executing programs including a program for the specific server, the prediction error depending on the specific server to the correlation between metrics regarding the common performance items of the specific server.

8. A method for migration of a system constructed in a source processing system to one of a plurality of destination processing systems, the system being constructed by disposing a predetermined program, comprising:

storing a correlation model for a state of executing the predetermined program in the source processing system, the correlation model indicating a correlation between each pair of one or more metrics of the system;

generating, for each of the plurality of destination processing systems, by correcting the correlation model for the source processing system using benchmark performances of the one or more metrics acquired in a state of executing a predetermined benchmark program in the source processing system and the destination processing system, a prediction model of the correlation model for a state of executing the predetermined program in the destination processing system;

calculating, for each of the plurality of destination processing systems a predicted performance ratio of the destination processing system to the source processing system for a state of executing the predetermined program by using the generated prediction model, without executing the predetermined program in the destination processing system; and constructing the system by disposing the predetermined program in a destination processing system selected from the plurality of destination processing systems based on predicted performance rations calculated for the plurality of destination processing systems, the system being migrated from the source processing system to the selected destination processing system, wherein the predetermined program includes programs for a plurality of servers, and the correlation model is corrected by calculating a benchmark performance ratio that is a ratio of a benchmark performance of a metric indicating a communication performance between servers in the destination processing system to a benchmark performance of the metric in the source processing system, and multiplying a correlation coefficient of a correlation function indicating a correlation between the servers in the correlation model by the calculated benchmark performance ratio, and migration of the system including the predetermined program from the source processing system is improved by selecting the selected destination processing to which the system is migrated, resulting from construction of the system.

9. A non-transitory computer readable storage medium recording thereon a program, causing a computer to perform a method for migration of a system constructed in a source processing system to one of a plurality of destination processing systems, the system being constructed by disposing a predetermined program, comprising:

storing a correlation model for a state of executing the predetermined program in the source processing system, the correlation model indicating a correlation between each pair of one or more metrics of the system;

generating, for each of the plurality of destination processing systems, by correcting the correlation model for the source processing system using benchmark performances of the one or more metrics acquired in a state of executing a predetermined benchmark program in the source processing system and the destination processing system, a prediction model of the correlation model for a state of executing the predetermined program in the destination processing system;

calculating, for each of the plurality of destination processing systems a predicted performance ratio of the destination processing system to the source processing system for a state of executing the predetermined program by using the generated prediction model, without executing the predetermined program in the destination processing system; and constructing the system by disposing the predetermined program in a destination processing system selected from the plurality of destination processing systems based on predicted performance rations calculated for the plurality of destination processing systems, the system being migrated from the source processing system to the selected destination processing system, wherein the predetermined program includes programs for a plurality of servers, and the correlation model is corrected by calculating a benchmark performance ratio that is a ratio of a benchmark performance of a metric indicating a communication performance between servers in the destination processing system to a benchmark performance of the metric in the source processing system, and multiplying a correlation coefficient of a correlation function indicating a correlation between the servers in the correlation model by the calculated benchmark performance ratio, and migration of the system including the predetermined program from the source processing system is improved by selecting the selected destination processing to which the system is migrated, resulting from construction of the system.

* * * * *